United States Patent [19]
Zimmer et al.

[11] Patent Number: 4,741,567
[45] Date of Patent: May 3, 1988

[54] ROBOTIC SYSTEM AND END EFFECTOR

[75] Inventors: John J. Zimmer, Cherry Hill; Paul B. Pierson, Medford, both of N.J.

[73] Assignee: RCA Corporation, Princeton, N.J.

[21] Appl. No.: 2,290

[22] Filed: Jan. 12, 1987

[51] Int. Cl.$^4$ .............................. B66C 1/02; B66C 1/10
[52] U.S. Cl. .......................................... 294/2; 271/92; 294/65; 294/907; 414/737
[58] Field of Search ...................... 414/737, 744 B, 752; 271/91, 106, 265, 98, 92; 901/40; 294/2, 65, 64.1, 119.1, 907

[56] References Cited

U.S. PATENT DOCUMENTS

| | | | |
|---|---|---|---|
| 3,901,392 | 8/1975 | Streckert | 414/900 X |
| 3,999,795 | 12/1976 | Barker | 271/108 X |
| 4,473,247 | 9/1984 | Itemadani et al. | 414/71 |
| 4,479,673 | 10/1984 | Inaba et al. | 294/88 |
| 4,639,184 | 1/1987 | Knasel et al. | 901/49 X |
| 4,669,716 | 6/1987 | Vander Syde et al. | 271/98 |

FOREIGN PATENT DOCUMENTS

| | | | |
|---|---|---|---|
| 0238494 | 4/1960 | Australia | 414/744 B |
| 0131480 | 2/1960 | U.S.S.R. | 297/2 |

OTHER PUBLICATIONS

"High-Speed Space Encoding Projector for 3D Imaging", by Rosenfeld et al., published in connection with the United States Postal Service Advanced Technical Conference, Oct. 1986.

"Implementation of RCCL, a Robot Control C Library on a MicroVAX II", by Lee, published in SPIE, vol. 726, Intelligent Robots and Computer Vision (1986).

"Three Dimensional Inspection using Multistripe Structured Light" by Jalkio et al., published in vol. 24, No. 6, Optical Engineering, Nov./Dec. 1985.

"Shape From Light Stripe Texture", by Hu, 1986.

*Primary Examiner*—Robert J. Spar
*Assistant Examiner*—Donald W. Underwood
*Attorney, Agent, or Firm*—Clement A. Berard, Jr.; William H. Meise

[57] ABSTRACT

An end effector suitable for manipulating articles such as mail flats is disclosed. This end effector has parallel reciprocating arms having suction cups for gripping the article to be manipulated and mechanical grippers mounted on the arms outboard of the suction cups. These mechanical grippers may be actuated to provide a mechanical grip on a manipulated article in addition to the suction grip.

8 Claims, 2 Drawing Sheets

ROBOTIC SYSTEM AND END EFFECTOR

The government has rights to this invention pursuant to contract No. 104230-84-D-0929 awarded by the United States Postal Service.

BACKGROUND OF THE INVENTION

The present invention relates to the field of robotic end effectors and more particularly to end effectors suitable for the manipulation of articles such as mail.

The high volume of mail which is handled by the U.S. Postal Service makes it desirable to sort mail in a fully automatic manner. One category of mail which presents particular problems for sorting is known as flats. Flats include relatively wide, relatively thin envelopes and magazines whose lateral dimensions range from 6.0 to 11.12 inches by 7.5 to 15.0 inches and whose thickness varies from a single sheet of paper to as thick as one inch or more. Incoming flats arrive at a sorting center in bags or bins and are dumped into the sorting system. As a result, there is no predetermined orientation or order to those flats. In addition, the location of the flat which is on top of the pile of flats is not predictable. In order to sort these flats, each one must be removed from the incoming pile, have its destination determined and then be placed in an appropriate outgoing bin or conveyor.

The sorting of such articles creates particular problems for robotic systems because of the varying sizes of the flats, their varying orientations and the inclusion in flats of envelopes which are sealed at all sides, magazines which are enclosed in sleeves and magazines which are bound along only one edge and not enclosed in sleeves. To be effective, a robotic system for sorting such flats must be small, reliable, capable of high-speed operation and able to handle the full variety of flats in whatever orientation they arrive at the robotic system. Thus, there is a need for a robotic end effector which can manipulate flats in a variety of sizes and configurations including sealed envelopes, bound magazines in sleeves and bound magazines without sleeves.

SUMMARY OF THE INVENTION

The present invention provides this manipulation capability through the provision of an end effector having parallel reciprocation arms each of which has a suction cup for gripping a flat article. The suction cups are compliantly mounted to enable the end effector to grasp surfaces which are not parallel to its arms. The system includes means for controlling the grip of the suction cups which may include means for selectively connecting a source of vacuum or gas pressure to the interior of the suction cup to grip and repel articles, respectively. The end effector preferably includes a mechanical gripper at the outer end of each arm to provide additional gripping force for articles being manipulated by the end effector. In a complete system, the end effector is mounted on a robotic positioner which moves it between the locations of articles to be manipulated and their destinations and rotates the end effector into a desired alignment with an article to be manipulated. A completely automatic system includes a vision system for determining the location, orientation and overlap of articles and for identifying the location and orientation of the top article in a pile.

DETAILED DESCRIPTION

Figure 1:
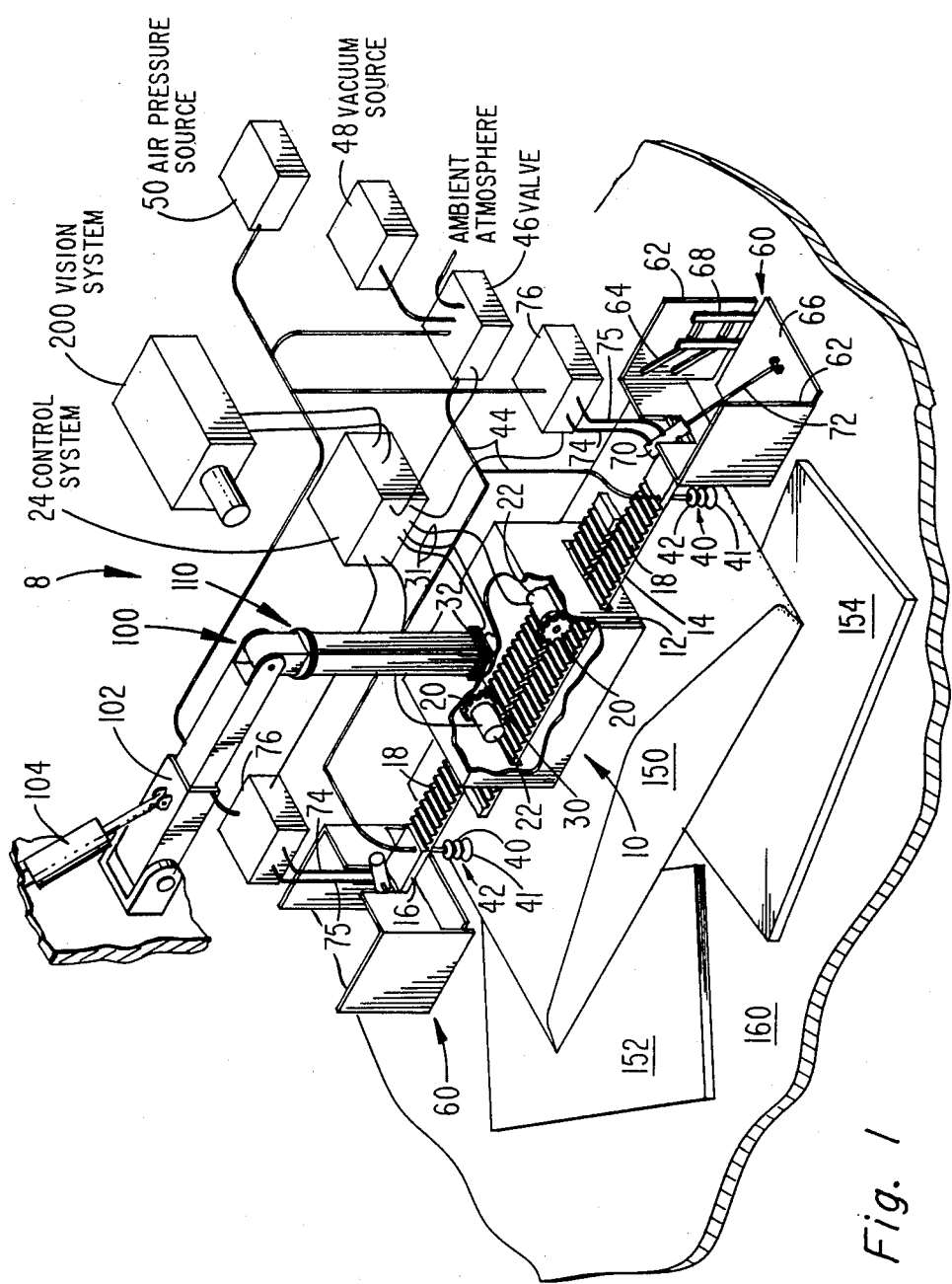
FIG. 1 is a perspective view of an illustrative sorting system including an end effector in accordance with the invention.

A sorting system in accordance with the present invention is shown generally as system 8 in FIG. 1. System 8 includes an end effector shown generally at 10, a robotic positioner 100, a control system 24, a vision system 200 and a pneumatic system for operating parts of the end effector. The end effector 10 has parallel arms 14 and 16 extending from opposite sides of a body 12. Each of the arms 14 and 16 includes a rack 18 on its upper surface and is mounted within the body 12 for reciprocal longitudinal motion. Each rack meshes with its own motor-driven drive gear 20. The racks and gears enable the span of the arms 14 and 16 to be adjusted to the size of an article 150 to be manipulated. The article 150 may be directly on a support surface 160 or on top of other articles as shown illustratively by articles 152 and 154. Support surface 160 may be fixed or may be a conveyor or other moving or movable support. The arms 14 and 16 are preferably extended and retracted together so that the center of the end effector is always aligned with the center of an article which it is manipulating. The drive gears 20 may be driven by individual stepper motors 22, by other types of motors or by a single motor as may be desired. The control system 24 controls the overall operation of the sorting system 8, including end effector 10.

Each arm 14 and 16 has a suction cup 40 mounted near its outboard end. These suction cups have suction surfaces 41 for contacting the article 150 to be manipulated. Each of the illustrated suction cups includes a bellows 42 between the suction surface 41 and the attachment to the arm 14 and 16. These bellows provide compliant mounting of the suction surface 41 allow that surface to deflect from parallel to the plane of the arms. This enables the suction cups to grip surfaces which are not parallel to the arms.

In order to control the suction or gripping force of the suction cups, the suction cups are connected by conduits 44 to a valve 46 which selectively connects the conduits 44 to a source of vacuum 48, a source of gas pressure 50 or to the ambient atmosphere. In this way, a positive suction force is provided when the vacuum is connected to the suction cups, a repulsion (negative suction) force is provided when air pressure is connected to the suction cups and a zero suction force (a neutral condition) is provided when the ambient atmosphere is connected to the suction cups.

The three-way valve 46 may comprise a main chamber having a common port connected to the conduit 44 and three controlled ports, one connected to the vacuum source 48, one connected to the air pressure source 50 and one connected to the ambient atmosphere. In such valve, a valve member selectively opens only one of the controlled ports at a time. Other valve structures may also be used. If desired, the valve 46 can be a two state valve which connects either vacuum or atmospheric pressure to the suction cup. However, the three state system illustrated is preferred because of its positive release of articles.

For manipulating articles such as bound magazines which are not wrapped, it is desirable to be able to determine which is the bound edge. In order to do this, a force/torque sensor 30 is provided between the body 12 and the mounting plate 32 by which the end effector is attached to the robotic positioner 100. This force/torque sensor may be a F. T. series sensor Model No. F. T. 15/50 provided by the LORD Corporation whose address is Corporate Development Center, 407 Gregson Drive, Cary, N.C. 27511. The output from this force/torque sensor is provided to control system 24 along cables 31. When a bound magazine is lifted, the arm lifting the bound edge (at which the entire thickness of the magazine is lifted) manipulates a substantially greater mass than the arm lifting the unbound edge (at which only the cover is lifted by the suction cup). This difference in masses produces a torque about the mounting plate 32 which is sensed by the force/torque sensor 30. Alternatively, an individual force sensor may be provided at each suction cup to measure the force on each arm individually.

Figure 2:
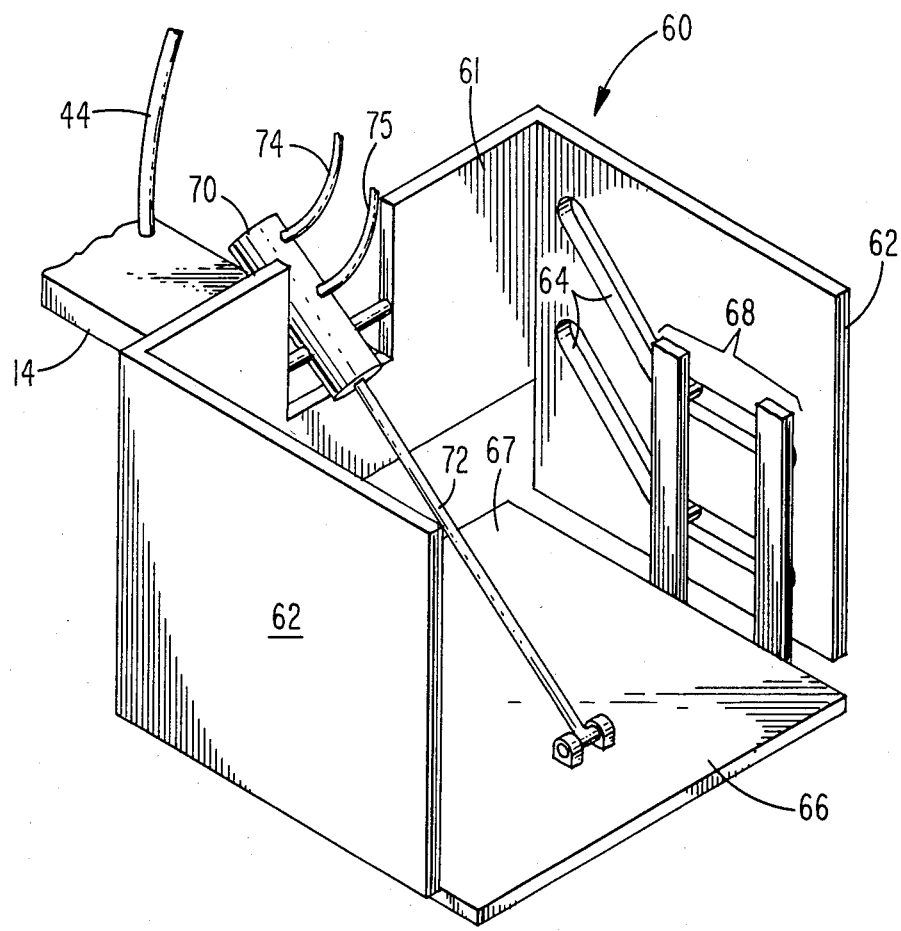
FIG. 2 illustrates in more detail one embodiment of the mechanical gripper portion of the end effector in FIG. 1.

In addition to the suction grip provided by suction cups 40, it is desirable to provide a positive mechanical grip on relatively heavy articles such as thick envelopes and magazines to ensure such articles will not be dropped while being manipulated and to enable the bound edge of a magazine to be gripped so that the magazine can be dragged rather than lifted. A mechanical gripper 60 is mounted at the outboard end of each of the arms 14 and 16 in order to provide such a mechanical grip on an article being manipulated. A wide variety of grippers may be utilized. A preferred gripper 60 is illustrated in greater detail in FIG. 2. The gripper 60 comprises a frame having two parallel plates 62 spaced apart by a support bar 61 which attaches the grippers to the end of the arm. The plates 62 have major surfaces disposed vertical and parallel to the length of the arm. Extending into each of these plates from their surfaces which face each other are a pair of grooves 64 in which a trolley 68 is retained. The trolley 68 is connected to a gripping member 66 to enable the gripping member 66 to move inward toward and outward away from the body 12 of the end effector and upward toward and downward away from the lower surface of the arm to which that gripper is attached. The gripping member is driven by an air cylinder 70 through a drive rod 72 which is journaled on the upper surface of the gripping member 66. A pair of conduits 74 and 75 connect the air cylinder 70 to a control valve 76 (see FIG. 1) which is connected to the air pressure source 50 by a conduit 78. A separate control valve 76 is provided for each arm's gripper so that the grippers can be operated independently.

Control valve 76 operates in response to control signals from control system 24 and has two positions, one in which air pressure is applied to the extension end of air cylinder 70 through conduit 74 in order to extend the drive rod 72 and a second position in which the air pressure is applied through conduit 75 to the retraction end of the air cylinder 70 in order to retract the drive rod 72. In its fully extended position, the drive rod 72 holds the gripping member 66 and its trolley at the outboard end of the gripper housing. In the illustrated embodiment the gripping member 66 is at its lowest position when the rod 72 is fully extended. As the rod 65 retracts, the gripping member 66 and its trolley are pulled inward toward the body 12. Initially a pure inward motion is imparted for a distance which is sufficient to bring the leading or forward edge 67 of the gripping member 66 under an article gripped by the adjacent suction cup 40. As the inward motion continues, the trolley moves upward along the slant of groove 64 thereby raising the gripping member 66 to cause the upper or gripping surface of the forward edge 67 of member 66 to press against the underside of an article held by the suction cups 40. This pinches the article between the gripping surface of member 66 and the arm to which it is attached. If the suction cup retracts into the arm so that the upper surface of the article contacts the under side of the arm, then the article will be pinched against the lower surface of the arm. If the suction cup does not retract, then the article is pinched between the gripping member and the suction cup or other downward protrusion on the arm. The gripping force applied by gripping member 66 depends on the air pressure applied to the air cylinder 70 and the mechanical advantage of the system linkage. Thus, the force can be set at a desired value.

To manipulate an article, arms 14 and 16 are extended or retracted in accordance with the size of the article to be manipulated so that the suction cups 40 on both arms will contact the upper surface of the article and the gripping members on both arms will be beyond the edges of the article in their retracted states but close enough to the edges adjacent thereto to extend under those edges when in their actuated states. Once the suction cups contact the article, the valve 46 is set to its vacuum position. The vacuum thereupon effects a sealing of the suction cups to the upper surface of the article and the bellows 42 collapse thereby drawing the article upward toward the body 12 of the end effector.

The force exerted on the end effector 10 by the article is sensed by torque/force sensor 30 and transmitted to control system 24. If, as the article is lifted, there is a difference in the masses lifted by the two arms, then that difference in masses creates a torque about the attachment plate 32. This torque is sensed by torque/force sensor 30 and transmitted to the control system 24.

When a torque signal is received by the control system, that system responds to its sign (which indicates which arm is lifting the greater mass) by actuating the valve 76 for the gripper at the end of the arm which is lifting that greater mass. This causes gas pressure to be applied to the retraction chamber of that gripper's air cylinder 70. This drives the actuator rod 72 inward which draws that gripper's gripping member inward under the article and upward against the bottom surface of the article to pinch it between the gripping member and the lower surface of the arm. If separate force sensors are provided for the individual suction cups, then which arm is lifting the greater mass is determined by comparing the signals from those sensors.

This response to the lifting of different masses is based on the fact that in most cases, a difference in lifted masses results from manipulation of a magazine which is not wrapped. The greater manipulated mass is at the bound edge of such a magazine. This gripping action holds the bound edge securely against the arm which is manipulating that edge. This makes it possible for the end effector to drag the magazine across the pile of other articles to its desired destination. A dragging action is considered desirable to prevent the magazine's pages from separating and allowing blown-in (loose) advertisement cards to fall out of the magazine.

When both arms are lifting substantially the same mass, no torque is developed about the force/torque sensor 30 and the system can actuate the grippers at the ends of both arms or neither arm. The choice of both or neither can be fixed for the system or determined by the mass of the manipulated article. Thus, articles weighting less than a particular value (those for which the force signal from sensor 30 does not exceed a threshold value) can be manipulated without actuating either gripper and articles weighing more than that value (those for which the force signal from sensor 30 exceeds the threshold value) can be manipulated with both grippers actuated.

Maximum utility for the end effector is provided by attaching the end effector to a robotic positioner 100 which includes an extensible, elevatable member 102 attached to a rotatable support 104 which enable the end effector to be placed at any desired location within reach of the positioner. A wrist or swivel 110 between arm 102 and end effector 10 can rotate the end effector relative to the positioner. Positioner 100 operates in response to position and orientation control signals provided by control system 24. Manipulation of the positioner places the center of the end effector over the geometric center of the article to be manipulated and rotates the end effector to place its arms perpendicular to the long sides of the article. This arm orientation is optional, but is chosen because most magazines are bound along a long edge and it is desirable to grasp the bound edge of such a magazine.

Signals specifying the location of the article to be manipulated are provided to control system 24, these signals specify the location of that article's geometric center (preferably including its elevation) relative to a coordinate system, the angle of that article's long edges relative to the coordinate system and the spacing between those long edges. These signals may preferably be a position signal specifying the coordinates of the geometric center of that top article relative to the coordinate system, an orientation signal specifying the angle of the long edges of the article relative either to the reference system or to a line from the center of the reference system to the geometric center of the article and a width or spacing signal specifying the distance between the long edges, In response to the position and orientation signals, the control system 24 provides the robotic positioner 100 with control signals which direct it (1) to a position in which the center of the end effector's body 12 is over the geometric center of the top article and (2) to rotate the end effector to an orientation in which the arms 14 and 16 are perpendicular to the long edges of the article. In response to the spacing signal, control system 24 provides arm extension drive signals to the motors 20 which cause arms 14 and 16 to extend or retract to a position in which the spacing between the grippers 60 is slightly larger than the spacing of the article's long edges. Preferably, the rotation of the body 12 and the extension of the arms 14 and 16 to a length which is appropriate for the identified size of the article both take place while the robotic positioner is in transit from the release point of the previous article to the location of the selected article.

The position, orientation and spacing signals may be generated from operator input. This input can be complete prior to the start of the manipulation process or can involve adjustment of the position during the manipulation process.

In order to make the operation of this end effector fully automatic, a vision system 200 views the pile of articles to be sorted and identifies the article which is at the top of the pile. If no article is on top (that is, every article in the pile has another article lying on top of one of its edges) then the pile may be stirred until an article is on top. Vision system 200 also determines the location of the geometric center of that top article, and the orientation and size of that article. From this determination the vision system generates the position, orientation and spacing signals which enable control system 24 to cause the end effector to move to and grip the identified article.

In a mail sorting system, once the end effector has gripped an article, the control signals are changed to cause the system to move the end effector and thus the article to the article's destination—either a bin in which or a transport system on which that article is to be placed. Once the article reaches its desired location the control signals are changed again to release the article. This release is accomplished by first switching the valves 76 to direct air pressure to the extension end of the air cylinders 70 to retract the end effector's gripping members and then switching the valve 46 to its air pressure position to repel the article from the suction cups 40. The end effector is then moved to the next article which has been identified to be manipulated.

Each effector 10 can be provided with two additional arms oriented perpendicular to arms 14 and 16, if gripping all four edges of articles is considered desireable.

What is claimed is:

1. A robotic end effector for manipulating articles, comprising:
    first second substantially parallel arms, each including an inboard end and an outboard end, said arms being mounted for reciprocal longitudinal motion;
    means for extending said arms;
    first and second suction cups mounted near said outboard ends of said first and second arms, respectively, with their suction surfaces facing away from said arms; and
    means for sensing which of said first and second arms is manipulating the greater mass.

2. A robotic end effector for manipulating articles, comprising:
    first and second substantially parallel arms, each of said arms including an inboard end and an outboard end, each of said arms being mounted for reciprocal longitudinal motion;
    means for extending said arms so as to controllably position the outboard ends of each of said arms;
    first and second suction cups, said first and second suction cups being mounted near said outboard ends of said first and second arms, respectively, with their suction surfaces facing away from their respective arms;
    a source of vacuum coupled by valve means and conduit to said suction cups for controlling the application of vacuum to said suction cups for controlling the suction force thereof;
    means coupled to said arms and responsive to the forces on said arms resulting from manipulating an article for sensing that one of said first and second arms which is manipulating the greater mass;
    first and second grippers coupled to the outboard ends of said first and second arms, respectively; and
    means for actuating said gripper on said one arm which said means for sensing identifies as manipulating the greater mass.

3. The end effector recited in claim 1 including:

means for compliantly mounting said suction cup's suction surface on said arm for enabling said suction cup to grip surfaces disposed at a variety of angles relative to said arm.

4. The end effector recited in claim 3 wherein said means for compliantly mounting comprises a part of said suction cup disposed between said suction surface and said arm.

5. The end effector recited in claim 3 further comprising:
   means for controlling the suction force of said suction cup, including:
      a source of vacuum; and
      a conduit coupled between said suction cup and said source of vacuum, said conduit including valve means for controlling the application of vacuum to said suction cup.

6. The end effector recited in claim 5 wherein each of said arms further comprises:
   a gripper at the outboard end thereof, said gripper including a gripping member having an actuated position in which said gripping member provides additional support for an article gripped by said suction cup and a retracted position in which said gripping member is disposed outboard of said suction cup; and
   means for actuating said gripper for moving said gripping member between said actuated and retracted positions.

7. A robotic end effector for manipulating articles comprising:
   first and second substantially parallel arms, each including an inboard end and an outboard end, said arms being mounted for reciprocal longitudinal motion;
   means for extending said arms;
   first and second suction cups, each including a suction surface, said first and second suction cups being mounted near said outboard ends of said first and second arms, respectively, with each of said suction surfaces facing away from that arm on which it is mounted;
   wherein each of said arms further comprises a gripper at said outboard end thereof, said gripper including a gripping member having an actuated position in which said gripping member provides additional support for an article gripped by said suction cup and also having a retracted position in which said gripping member is disposed outboard of said suction cup; and
   means for actuating said gripper for moving said gripping member between said actuated and retracted positions.

8. A robotic end effector for manipulating articles, comprising:
   first and second substantially parallel arms, each including an inboard end and an outboard end, said arms being mounted for reciprocal longitudinal motion;
   means for extending said arms;
   first and second suction cups, each including a suction surface, said first and second suction cups being mounted near said outboard ends of said first and second arms, respectively, with said suction surfaces facing away from said arms;
   each of said arms further comprising a gripper at the outboard end thereof; said gripper including a gripping member having an acuated position in which said gripping member provides additional support for an article held by said suction cup and also having a retracted position in which said gripping member is disposed outboard of said suction cup and also comprising means for actuating said gripper for moving said gripping member between said actuated and retracted positions;
   means for sensing forces on said end effector; and
   means responsive to said means for sensing for determining which of said arms is manipulating the greater mass and for activating said means for actuating said gripper of said determined arm to move said gripping member thereof to its actuated position.

* * * * *